(12) United States Patent
Boyer et al.

(10) Patent No.: US 7,573,586 B1
(45) Date of Patent: Aug. 11, 2009

(54) METHOD AND SYSTEM FOR MEASURING A COATING THICKNESS

(75) Inventors: Jesse R. Boyer, Berlin, CT (US); Gene P. Allocca, Kensington, CT (US); Randall W. Joyner, Union, CT (US); Jeffrey K. Pearson, Newport Beach, CA (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 12/131,223

(22) Filed: Jun. 2, 2008

(51) Int. Cl.
*G01B 11/28* (2006.01)

(52) U.S. Cl. .................. 356/630; 356/603; 356/390; 356/398

(58) Field of Classification Search ......... 356/627–636, 356/603, 625; 430/30, 311; 156/626
See application file for complete search history.

(56) References Cited

U.S. PATENT DOCUMENTS

| | | | |
|---|---|---|---|
| 3,732,016 A * | 5/1973 | Deshayes et al. ............. 356/632 |
| 3,979,273 A | 9/1976 | Panzera et al. |
| 4,148,275 A | 4/1979 | Benden et al. |
| 4,456,379 A * | 6/1984 | Schumann et al. .......... 356/631 |
| 4,978,558 A | 12/1990 | Lamm |
| 5,225,246 A | 7/1993 | Beers et al. |
| 5,317,901 A | 6/1994 | Khan |
| 5,757,498 A | 5/1998 | Klein, II et al. |
| 6,055,058 A | 4/2000 | Krahbichler et al. |
| 6,165,542 A | 12/2000 | Jaworowski et al. |
| 6,549,291 B1 | 4/2003 | Dieter et al. |
| 6,731,277 B2 | 5/2004 | Rupieper et al. |

OTHER PUBLICATIONS

Geomagic Products, 1999-2007 Geomagic, Inc., http://www.geomagic.com/en/products/index.php.
Geomagic, Geomagic Blade, 1999-2007 Geomagic, Inc., http://www.geomagic.com/en/products/blade.

* cited by examiner

*Primary Examiner*—Sang Nguyen
(74) *Attorney, Agent, or Firm*—Carlson, Gaskey & Olds PC

(57) ABSTRACT

A method of measuring a coating thickness involves projecting a pattern of light on a surface. A first reflection of the pattern of light is received by a first image capturing device. A second reflection of the pattern of light is received by an image capturing device which may be the same or a different image capturing device. The first reflection is compared with the second reflection. A first dated map of the surface is created by comparing the first reflection and the second reflection. A coating is deposited on the surface. A second data map of the surface with the coating is created by comparing reflections. The first data map and the second data map are then compared to determine a thickness of the coating.

23 Claims, 2 Drawing Sheets

METHOD AND SYSTEM FOR MEASURING A COATING THICKNESS

BACKGROUND OF THE INVENTION

This invention relates to a method and system for measuring a thickness of a coating on a part, in particular an optical measuring system.

Parts for a turbine engine may require a coating to ensure their durability. For this reason, it is important to measure the thickness of the coating on the part. Typically, such an analysis requires cross-sectioning the part and using a microscope to measure the coating's thickness. As a consequence of this method of measurement, the part is destroyed. Inspecting parts in this manner is both expensive and time consuming.

A need therefore exists for a non-destructive technique and system for measuring the coating thickness.

SUMMARY OF THE INVENTION

The method of measuring a coating thickness involves projecting a pattern of light on a surface. A first reflection of the pattern of light is received at a first imaging capturing device while a second reflection of the pattern of light is received by the same image capturing device at a different location or by another image capturing device. The first reflection is compared to the second reflection. Based on the comparison, a first data map of the surface is created. A coating is then deposited on the surface. A second data map of the surface with the coating is created. The first data map is compared to the second data map to determine the thickness of the coating.

The various features and advantages of this invention will become apparent to those skilled in the art from the following detailed description. The drawings that accompany the detailed description can be briefly described as follows.

DETAILED DESCRIPTION OF THE PREFERRED EMBODIMENT

Figure 1:
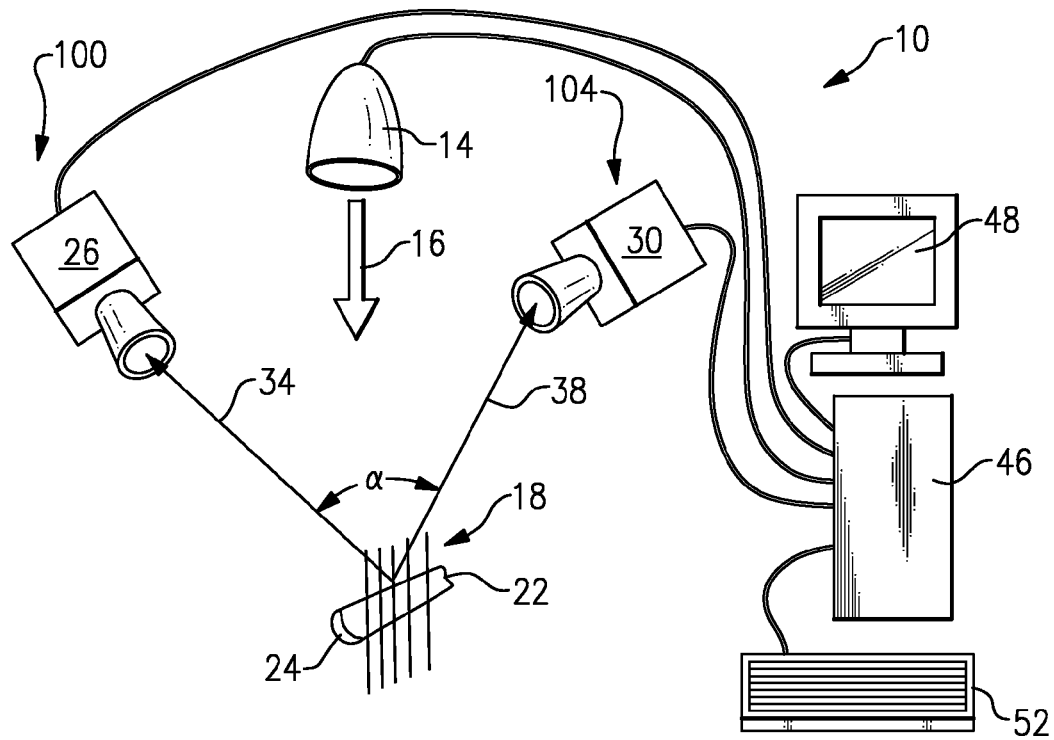
FIG. 1 illustrates a view of a system for measuring a coating thickness, including light projector, cameras, light pattern and computer.

With reference to FIG. 1, there is shown a system for measuring a coating thickness. System 10 has light projector 14, first image capturing device 26, such as a digital camera, at first location 100, second image capturing device 30 at second location 104, and computer 46, having display 48 with keyboard 52. System 10 is an optical three-dimensional scanner, such as produced by Capture 3D known as ATOS™. Light projector 14 projects light 16 to form pattern of light 18 on surface 22 of a part, such as turbine blade 24. Pattern of light 18 is scanned across turbine blade 24. First reflection 34 is reflected back to first image capturing device 26 while second reflection 38 is reflected back to second imaging capturing device 30. Alternatively to using two image capturing devices, first image capturing device 26 may be used alone by first capturing reflection 34 at location 100 and then moving first image capturing device 26 to location 104 and capturing reflection 104 of turbine blade 24 there. First reflection 34 forms angle α with second reflection 38. As a consequence, first image capturing device 26 and second image capturing device 30 permit a stereoscopic view of pattern of light on surface 22. Through triangulation as known, a surface map of surface 22 can be constructed by computer 46 through known software, such as offered by GEOMAGIC®. For a turbine blade, GEOMAGIC BLADE™ may be employed.

Figure 3:
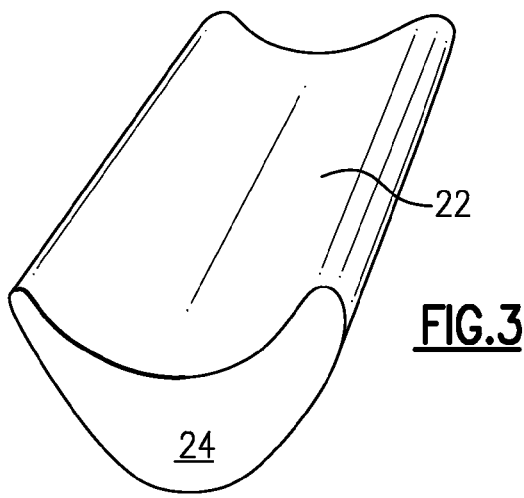
FIG. 3 illustrates a sample turbine blade with an uncoated surface.
Figure 4:
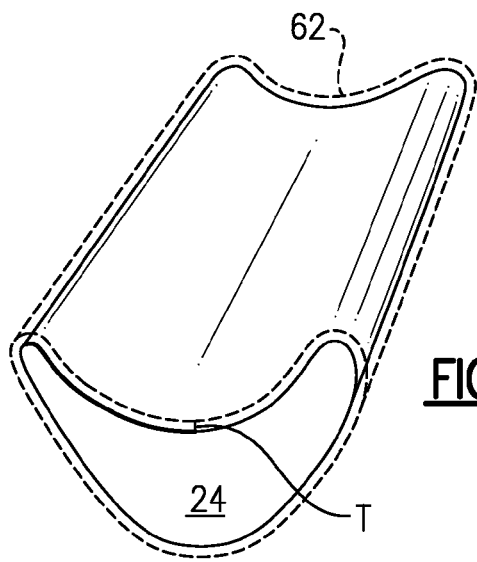
FIG. 4 illustrates the sample turbine blade of FIG. 3 with a coated surface.
Figure 2:
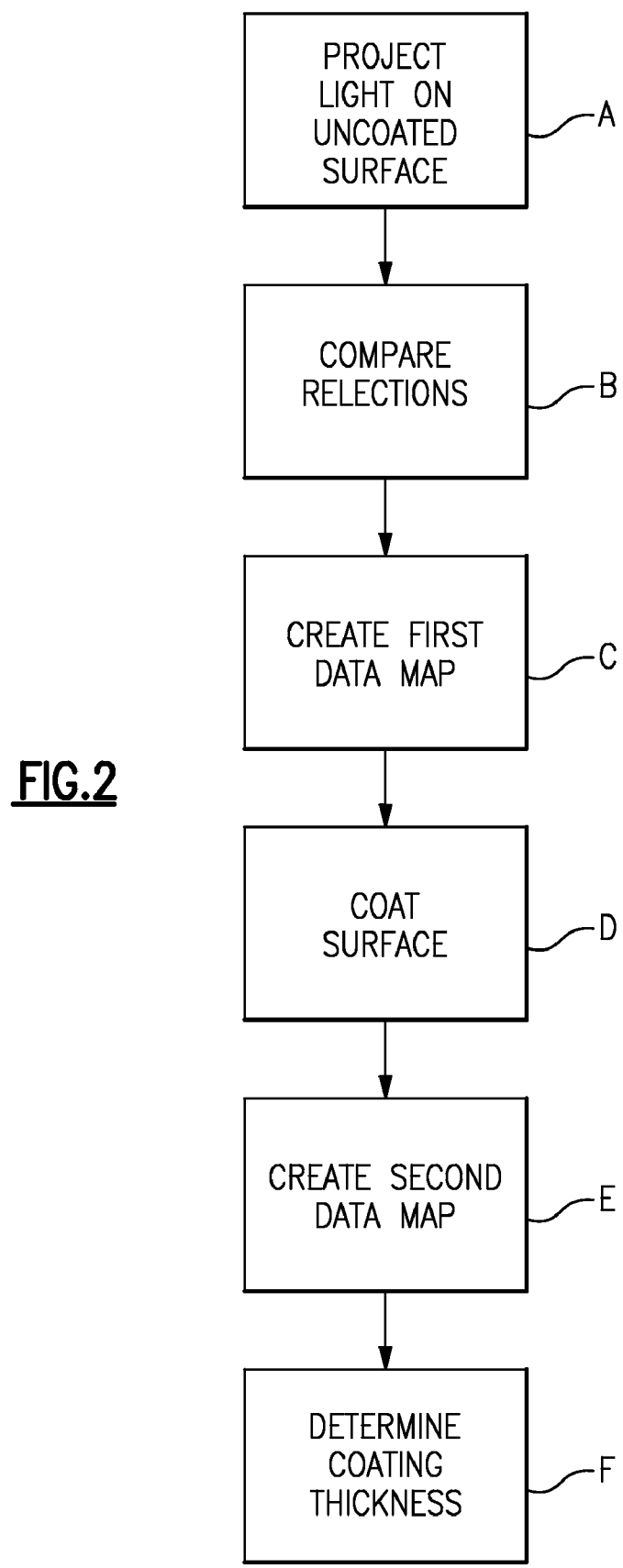
FIG. 2 illustrates a flowchart of the technique for measuring a coating thickness employed by the system shown in FIG. 1.

With reference to FIG. 2, the inventive technique for measuring a coating thickness will now be explained. As shown in FIG. 2, the first step, step A, involves projecting light pattern 18 on surface 22 of turbine engine blade 24. First image capturing device 26 and second image capturing device 30 are linked to computer 46 and permit the creation of first data map 50 by comparing the first reflection of light pattern 34 with second reflection of light pattern 38 as referenced in step B of FIG. 2. First data map 50 is thereby created (see step C). First data map 50 may be created following the preparation of surface 22 for coating. In this way, a more accurate representation of dimensions of surface 22 may be created by system 10. With reference to step D, surface 22 of turbine engine blade 24 is then coated in the same manner as all other parts in a particular production run. As shown in FIG. 3, turbine engine blade 24 has surface 22. Following coating, turbine engine blade 24 has surface 22 with coating 62 having thickness T. This thickness may vary across surface 22. Coating 62 may be altered, such as by heat treating or by peening. Following coating, heat treating and peening, surface 22 of turbine engine blade 24 is then placed under light pattern 18. Again, first reflection 34 is read by first image capturing device 26 and second reflection 38 is read by second image capturing device 30. A comparison of these reflections or images permits a creation of second data map 54 representing surface 22 with coating. First data map 50 is then overlayed with second data map 54. A difference between first data map 50 and second data map 54 is then determined, such as by subtracting values of the first data map from values of the second data map. This difference represents thickness of coating T.

By comparing first data map 50 with second data map 54, thickness of coating 62, T, may be determined without destroying turbine engine blade 24. There is no need to cut parts to determine coating thickness. Furthermore, the process is greatly expedited because a computer 46 has programming that not only creates first data map 50 and second data map 54 but determines a thickness of coating by comparing first data map 50 with second data map 54 automatically. The speed of this process thereby permits all or a larger sampling of parts for inspection for coating thickness.

The foregoing description shall be interpreted as illustrative and not in any limiting sense. A worker of ordinary skill in the art would recognize that certain modifications would come within the scope of this invention. For that reason, the follow claims should be studied to determine the true scope and content of this invention.

We claim:

1. A method of measuring a coating thickness, comprising the steps of:
    (a) projecting a pattern of light on a surface;
    (b) receiving a first reflection of the pattern of light;
    (c) receiving a second reflection of the pattern of light;
    (d) comparing the first reflection with the second reflection;
    (e) creating a first data map of the surface by comparing the first reflection and the second reflection;

(f) depositing coating on the surface;

(g) repeating steps (a)-(d) on the surface after the step of depositing and thereby creating a second data map of the surface with the coating; and (h) comparing the first data map with the second data map to determine a thickness of the coating using a programmable computer.

2. The method of claim 1 wherein comparing comprises the step of overlaying the first data map and the second data map.

3. The method of claim 2 including the step of:

(j) determining a difference between the first data map and the second data map.

4. The method of claim 3 wherein the step (j) comprises subtracting values of the first data map from values of the second data map.

5. The method of claim 1 including the step of:

(k) preparing the surface for coating.

6. The method of claim 5 wherein step (k) occurs prior to step (e).

7. The method of claim 1 including the step of:

(l) altering the coating prior to step (g).

8. The method of claim 7 wherein altering the coating comprises heat treating the coating.

9. The method of claim 7 wherein altering the coating comprises peening of coating.

10. The method of claim 1 wherein the surface is a turbine engine component surface.

11. The method of claim 1 wherein the first reflection forms an angle with the second reflection.

12. The method of claim 11 wherein step (b) comprises receiving the first reflection of the pattern of light by a first image capturing device and step (c) comprises receiving the second reflection of the pattern of light by a second image capturing device.

13. A method of measuring a coating thickness, comprising the steps of:

(a) projecting a pattern of light on a surface;

(b) receiving a first reflection of the pattern of light at a first image capturing device;

(c) receiving a second reflection of the pattern of light at a second image capturing device;

(d) comparing the first reflection with the second reflection;

(e) creating a first data map of the surface by comparing the first reflection and the second reflection;

(f) depositing a coating on the surface;

(g) repeating steps (a)-(d) on the surface with the coating and thereby creating a second data map of the surface with the coating; and (h) comparing the first data map with the second data map by overlaying the first data map and the second data map to determine a thickness of the coating using a programmable computer.

14. The method of claim 13 including the step of:

(l) determining a difference between the first data map and the second data map.

15. The method of claim 14 wherein the step (j) comprises subtracting values of the first data map from values of the second data map.

16. The method of claim 13 including the step of:

(k) preparing the surface for coating.

17. The method of claim 16 wherein step (k) occurs prior to step (e).

18. The method of claim 13 including the step of:

(l) altering the coating prior to step (g).

19. The method of claim 18 wherein altering the coating comprises heat treating the coating.

20. The method of claim 18 wherein altering the coating comprises peening the coating.

21. The method of claim 13 wherein the surface is a turbine engine component surface.

22. A system for measuring a coating thickness, comprising:

a light projector having a light pattern, said light projector configured to project said light pattern on a surface;

at least one image capturing device configured to receive a first reflection of said light pattern, a second reflection of said light pattern, or both the first reflection of said light pattern and the second reflection of said light pattern, wherein said first reflection forms an angle with said second reflection; and a computer in communication with said at least one image capturing device, said computer programmed to compare said first reflection and said second reflection, to create a first data map of the surface and a second data map of the surface with a coating on the surface, and to determine a thickness of the coating by comparing the first data map to the second data map.

23. The system of claim 20 wherein said at least one image capturing device comprises a first image capturing device and a second image capturing device, said first image capturing device positioned to receive said first reflection and said second image capturing device positioned to receive said second reflection.

* * * * *